US012148548B2

(12) United States Patent
Bussi et al.

(10) Patent No.: US 12,148,548 B2
(45) Date of Patent: Nov. 19, 2024

(54) INSULATED CONDUCTOR FOR USE IN A WINDING, WINDING DERIVED THEREFROM AND CORRESPONDING MANUFACTURING METHODS

(71) Applicant: ARKEMA FRANCE, Colombes (FR)

(72) Inventors: Philippe Bussi, Colombes (FR); Clément Paul, Serquigny (FR); Pierre Gonnetan, Serquigny (FR)

(73) Assignee: ARKEMA FRANCE, Colombes (FR)

( * ) Notice: Subject to any disclaimer, the term of this patent is extended or adjusted under 35 U.S.C. 154(b) by 88 days.

(21) Appl. No.: 17/997,269

(22) PCT Filed: Apr. 30, 2021

(86) PCT No.: PCT/EP2021/061482
§ 371 (c)(1),
(2) Date: Oct. 27, 2022

(87) PCT Pub. No.: WO2021/219889
PCT Pub. Date: Nov. 4, 2021

(65) Prior Publication Data

US 2023/0245796 A1 Aug. 3, 2023

(30) Foreign Application Priority Data

Apr. 30, 2020 (FR) ....................................... 2004300

(51) Int. Cl.
*H01B 13/00* (2006.01)
*H01B 3/30* (2006.01)
*H01B 3/42* (2006.01)

(52) U.S. Cl.
CPC ............. *H01B 3/427* (2013.01); *H01B 3/307* (2013.01); *H01B 13/0016* (2013.01)

(58) Field of Classification Search
CPC .... H01B 13/0016; H01B 13/00; H01B 3/307; H01B 3/427; H01B 3/30; H01B 3/42; H01B 7/0208
(Continued)

(56) References Cited

U.S. PATENT DOCUMENTS 8,013,251 B2 9/2011 Bhandari et al.
9,543,058 B2 1/2017 Knerr et al.
(Continued)

FOREIGN PATENT DOCUMENTS

CA 3019024 A1 10/2017
DE 102008024281 A1 * 12/2009 ........... B29C 64/153
(Continued)

OTHER PUBLICATIONS

CHEM3020 Polymer Chemistry_Islam_pp. 1-20_May 2020.*
(Continued)

*Primary Examiner* — Timothy J Thompson
*Assistant Examiner* — Guillermo J Egoavil
(74) *Attorney, Agent, or Firm* — Boone IP Law

(57) ABSTRACT

An insulated conductor including: at least one electrical conductor; and, an insulating coating covering said electrical conductor, having n layer(s), “n” being an integer greater than or equal to 1, the $n^{th}$ layer being the outermost layer having a pseudo-amorphous composition $C_n$ including at least 50% by weight of a polyaryletherketone. A process for manufacturing the insulated conductor, a heat-welding process using two sections of insulated conductor, and a coil capable of being obtained by heat-welding a winding of the insulated conductor.

19 Claims, 4 Drawing Sheets

(58) Field of Classification Search
USPC ........................................................ 174/110 R
See application file for complete search history.

(56) References Cited

U.S. PATENT DOCUMENTS

| | | | | |
|---|---|---|---|---|
| 10,186,345 | B2 | 1/2019 | Bonnet et al. | |
| 10,325,695 | B2 | 6/2019 | Fukuda et al. | |
| 2014/0224522 | A1 | 8/2014 | Yamazaki et al. | |
| 2016/0307667 | A1* | 10/2016 | Fukuda ................ | H01B 7/0036 |
| 2019/0040269 | A1 | 2/2019 | Brule et al. | |
| 2020/0147852 | A1* | 5/2020 | Clay ....................... | B29B 13/02 |

FOREIGN PATENT DOCUMENTS

| | | | | |
|---|---|---|---|---|
| EP | 0323142 | A2 | 7/1989 | |
| EP | 2767986 | A1 | 8/2014 | |
| EP | 2881430 | A1 | 6/2015 | |
| EP | 3093854 | A1 | 11/2016 | |
| WO | 2016160814 | A1 | 10/2016 | |
| WO | 2018234116 | A1 | 12/2018 | |
| WO | WO-2019150060 | A1 * | 8/2019 | ......... C08G 65/4012 |
| WO | WO-2020058790 | A1 * | 3/2020 | ............... H01B 3/30 |

OTHER PUBLICATIONS

Macromolecular modifications of Pekk_Choupin et al._103 to 110_Jul. 2018.*
Polymer Chemistry—Glass Transition_Whisnant_pp. 1-2_May 2020.*
Polymers in Additive Manufacturing_Collette-Arkema R & D_pp. 1-18_Jun. 2016.*
Semi-Crystalline-Polymers-Structure-vs-Properties-RGB_Entec_pp. 1-5_Sep. 2019.*
Semi-Crystalline-vs-Amorhous-Property-and-Processing_Entec_pp. 1-4_Mar. 2020.*
International Search Report (PCT/ISA/210) with English translation and Written Opinion (PCT/ISA/237) mailed on Jul. 30, 2021, by the European Patent Office as the International Searching Authority for International Application No. PCT/EP2021/061482.

* cited by examiner

[Fig. 1]
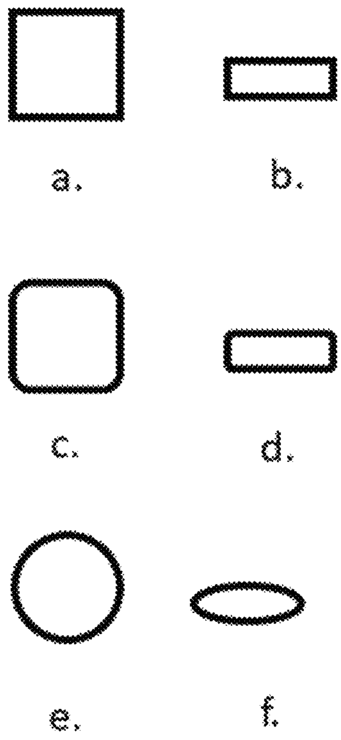
[Fig. 2]
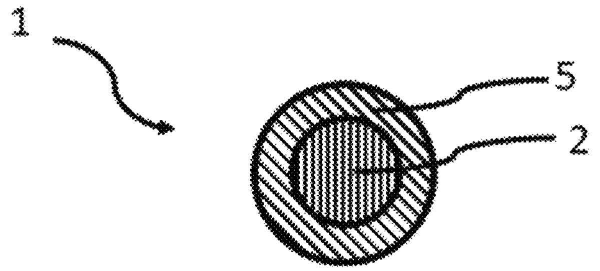

[Fig. 3]
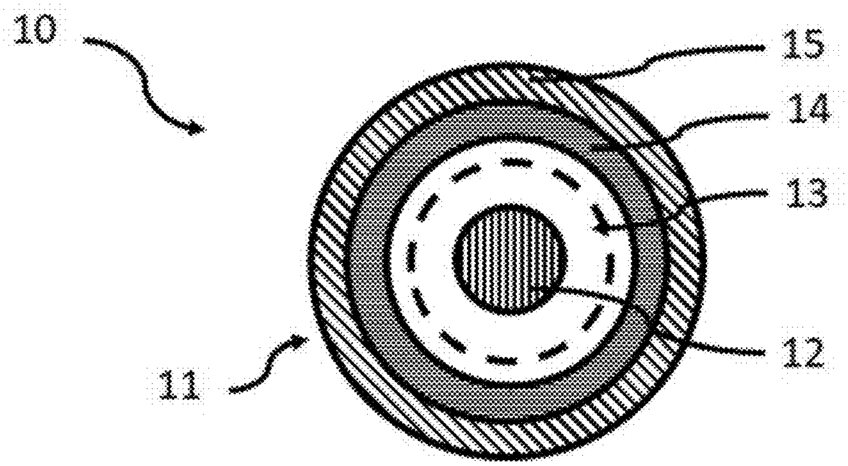
[Fig. 4]
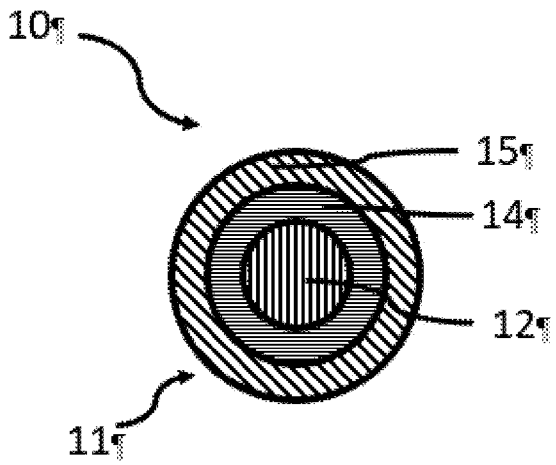

[Fig. 5]
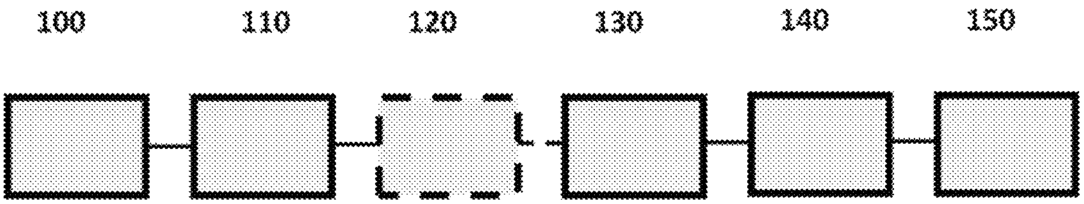
[Fig. 6]
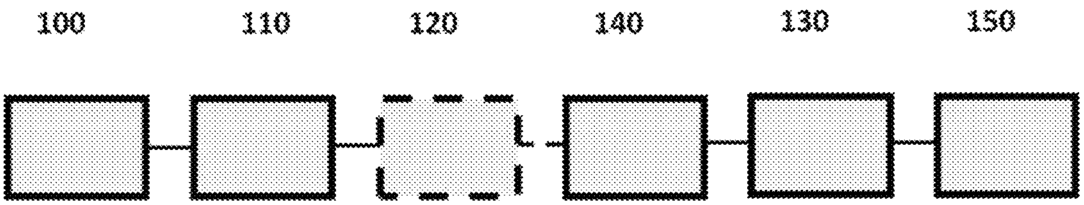
[Fig.7]
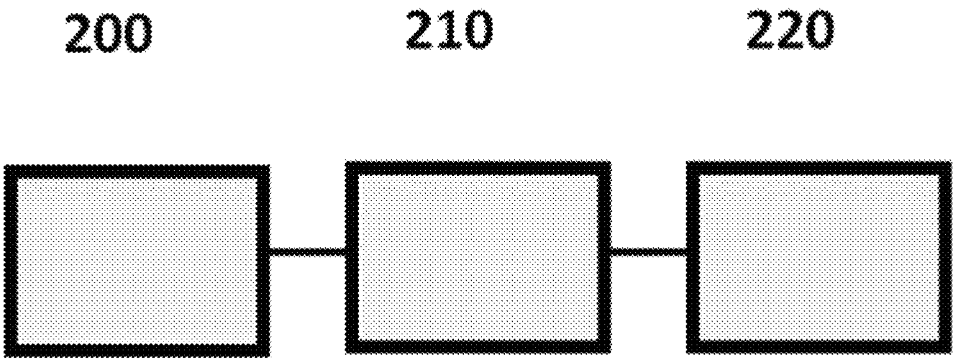

[Fig. 8]
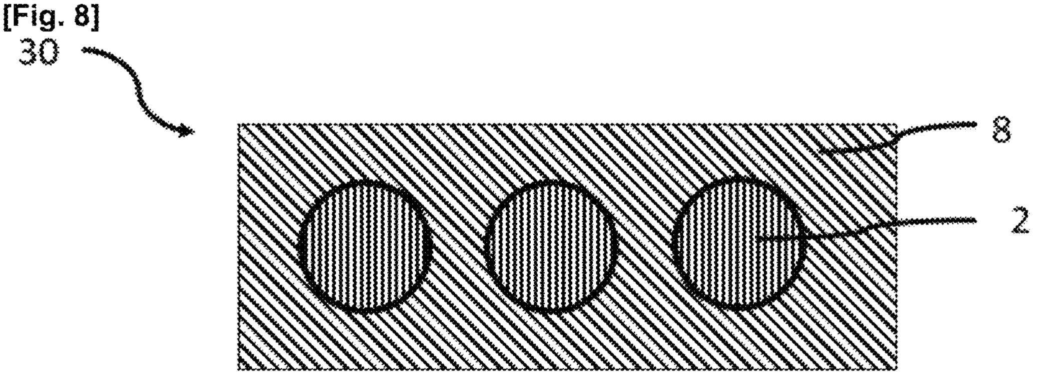
[Fig. 9]
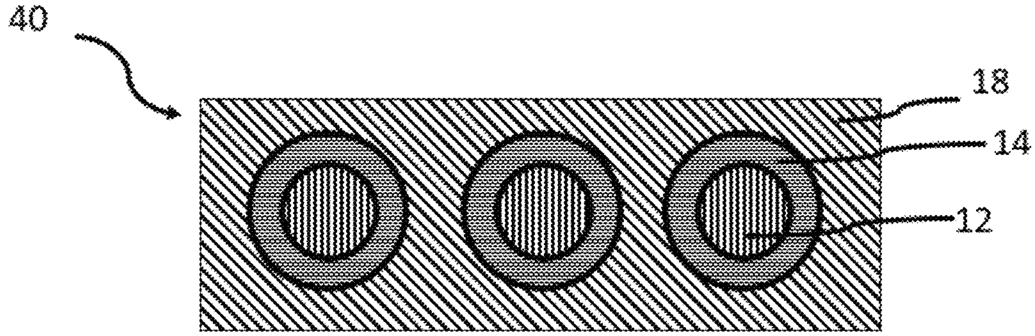

INSULATED CONDUCTOR FOR USE IN A WINDING, WINDING DERIVED THEREFROM AND CORRESPONDING MANUFACTURING METHODS

TECHNICAL FIELD

The invention relates to the field of insulated conductors comprising, as insulating coating, a peripheral layer based on polyaryletherketone(s).

The invention also relates to the field of electrical windings in which these insulated conductors are particularly suitable for use.

PRIOR ART

In electrical windings, the insulating materials must first of all insulate the conductor at the operating voltage, in particular with respect to partial discharges. The insulating materials must also withstand high mechanical and/or temperature stresses. It is for this purpose that several developments of insulated conductors comprising a polyaryletherketone as insulating material have already been used. Polyaryletherketones also have the advantage of exhibiting excellent fire resistance and of emitting only a small amount of smoke and other toxic gases.

The insulation of the windings is conventionally carried out in two stages. It comprises:

i) insulating the conductor itself with an insulating layer, generally denoted by the name "enamel";

ii) then, after winding the insulated conductor to form a winding, impregnating the winding with a chemical substance, generally denoted by the name "impregnation varnish".

The insulation of the conductor with "an enamel" that is a polyaryletherketone has been described in the prior art.

An insulated conductor is for example known from U.S. Pat. No. 10,186,345 that comprises an insulating layer of polyetheretherketone crystallized to a degree of crystallinity of at least 25%. The process for manufacturing such an insulated conductor comprises: i) a step of wrapping an insulated conductor with a polyetheretherketone tape around the conductor, ii) a step of heating the tape in order to melt the polymer and iii) a step of cooling the molten tape so as to obtain a crystallinity of the polymer of at least 25%.

Furthermore, it is also known to control the thickness of the oxide layer on the surface of the conductor, in particular of a copper or aluminum conductor, in order to increase the adhesion of the insulating material to the conductor. This makes it possible in particular in certain cases to dispense with the use of a base layer, generally necessary for good adhesion of the insulating material. Application US 2014/0224522 describes in particular the beneficial effect of an oxide layer of 5 nm to 300 nm for obtaining good adhesion with the insulating material. Application CA 3,019,024 states for its part that a conductor without any oxide layer also has a beneficial effect on the adhesion. The complete removal of the oxide layer is notably made possible by treatment with an ion plasma under a protective atmosphere.

The impregnation of the winding with "an impregnation varnish" is well known from the prior art but has not been described directly with a PAEK varnish. The impregnation varnish makes it possible in particular to firmly attach the turns of the coils together and therefore to increase their mechanical resistance to vibrations. The impregnation varnish also makes it possible to largely remove the air present within the winding, to provide protection against external chemical attacks and to improve the overall dielectric strength of the coil.

Only in application U.S. Pat. No. 10,325,695 has an example of a process for manufacturing a stack of insulated conductors been described, which comprises: a step of applying a layer of polyetherimide (PEI) to a metal conductor to form an insulated conductor; then a step of stacking the insulated conductors; and finally, a step of extruding PEEK onto the stack.

There is currently a need to provide windings capable of being subjected to ever more demanding mechanical and/or temperature and/or chemical conditions. Presently, there is a need to provide electrical windings in which the insulating material of the conductors comprises a composition based on polyaryletherketone(s) and in which the turns are held together by a composition based of polyaryletherketone(s).

Objectives of the Invention

One objective of the invention is to provide insulated conductors, capable of being held together in an electrical winding by a composition based on polyaryletherketone(s), the insulated conductors having, as the outermost layer, a layer (an "enamel") comprising a polyaryletherketone.

Another objective of the invention is to provide a process for obtaining these insulated conductors.

Another objective of the invention is to provide a process for heat welding between insulated conductors to replace the impregnation step. In other words, another object of the invention is to provide an alternative process for ensuring the insulated conductors are held together in a stack of insulated conductors.

SUMMARY OF THE INVENTION

The invention relates firstly to an insulated conductor comprising:

at least one electrical conductor; and, an insulating coating covering said electrical conductor.

The insulating coating consists of n layer(s), "n" being an integer greater than or equal to 1. The $n^{th}$ layer of the coating is the outermost layer and consists of a pseudo-amorphous composition $C_n$. The composition $C_n$ comprises at least 50% by weight of a polyaryletherketone.

An insulated conductor such as the one from the present invention would appear at first sight to be of little use to a person skilled in the art intending to use it for high temperature applications. Specifically, the use of compositions based on polyaryletherketone(s) have the advantage of exhibiting good high-temperature resistance. However, it is known that this resistance is much better for a composition which is in partially or completely crystallized form than for the same composition which is essentially in amorphous form. Thus, those skilled in the art would intuitively turn away from an insulated conductor having as coating a composition essentially in amorphous form.

The innovative and surprising idea of the inventors was to manufacture insulated conductors having a coating comprising an outer layer of pseudo-amorphous composition as an intermediate product in order to be able to carry out a process of heat welding by coalescence of the insulating coatings. Since the composition is crystallizable, it is able to crystallize after coalescence and therefore acquires good temperature resistance properties. The inventors were thus able to design assemblies of insulated conductors heat-welded together, the composition of what constituted the outermost layer of the insulating coatings being ultimately in at least partially crystallized form.

On the other hand, the inventors observed that the heat-welding process could not be carried out with coatings that were crystallize, at least partially, due to a very poor, or even non-existent, coalescence between the insulating coatings at a temperature below their melting temperature.

According to certain embodiments, said at least one electrical conductor comprises copper or an alloy thereof, aluminum, nickel or silver.

According to certain embodiments, the melt flow index of the composition $C_n$ has a value ranging from 1 to 100 $cm^3$/10 min at 380° C. and under a load of 5 kg. The melt flow index of the composition $C_n$ has preferentially a value ranging from 2 to 85, and more preferably a value ranging from 2 to 60 $cm^3$/10 min.

According to certain particular embodiments, the melt flow index of the composition $C_n$ can have a value of from 2 to 20 $cm^3$/10 min, or from 20 to 60 $cm^3$/10 min, or else from 60 to 85 $cm^3$/10 min.

According to certain embodiments, the composition $C_n$ further comprises another thermoplastic other than a polyaryletherketone and/or a filler and/or an additive. The other thermoplastic may in particular be chosen from the list consisting of: a fluorinated ethylene-propylene copolymer (FEP), a perfluoroalkoxy-alkane copolymer (PFA), a perfluoroelastomer (FFKM), a polyetherimide (PEI), a polyetherimide/polydimethylsiloxane (PEI/PDMS) block copolymer, a poly(ether sulfone) (PES), a polysulfone (PSU), a polyphenylene sulfone (PPSU), a poly(phenylene sulfide), a polyphenylene ether (PPE) and their mixture.

According to certain embodiments, the composition $C_n$ consists essentially, or consists, of said at least one polyaryletherketone.

According to certain embodiments, said at least one polyaryletherketone consists essentially, preferentially consists, of:

a terephthalic unit and an isophthalic unit, the terephthalic unit having the formula:

(I)

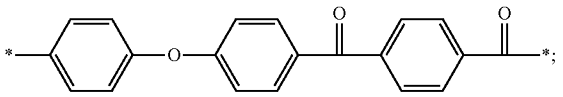

the isophthalic unit having the formula:

(II)

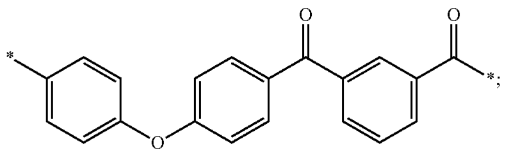

the molar percentage of terephthalic unit relative to the sum of the terephthalic and isophthalic units being from 0% to 85%.

The molar percentage of terephthalic unit relative to the sum of the terephthalic and isophthalic units is preferentially from 45% to 75%, more preferentially from 48% to 75%, and extremely preferably from 58% to 73%.

According to certain embodiments, said at least one polyaryletherketone is a copolymer comprising a unit of formula:

(III)

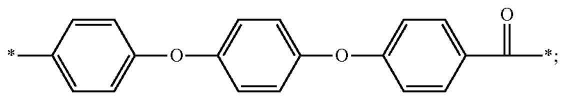

and a unit of formula:

(IV)

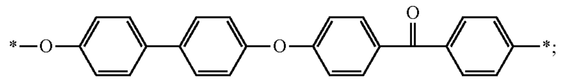

the molar percentage of unit (III), with respect to the sum of the units (III) and (IV), being from: 0% to 99%.

According to certain embodiments, said at least one polyaryletherketone is a copolymer comprising a unit of formula:

(III)

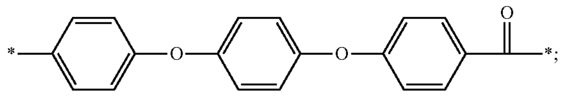

and a unit of formula:

(V)

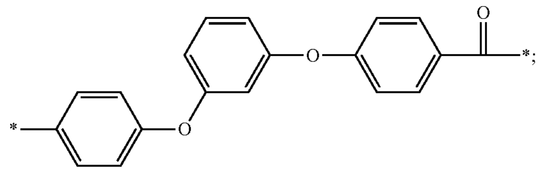

the molar percentage of unit (III), relative to the sum of the units (III) and (V), being from 0% to 99%.

According to certain embodiments, the $n^{th}$ layer has a thickness ranging from 5 micrometers to 1000 micrometers. Preferentially, the $n^{th}$ layer has a thickness ranging from 10 micrometers to 750 micrometers, more preferentially from 25 micrometers to 500 micrometers, and extremely preferably from 50 micrometers to 250 micrometers.

According to certain embodiments, the integer "n" is greater than or equal to 2. According to certain embodiments, the insulating coating comprises at least one intermediate layer, between said at least one electrical conductor and the $n^{th}$ layer of the coating, in particular the $(n-1)^{th}$ layer, which is a semicrystalline composition comprising a thermoplastic polymer having a melting point above or equal to that of the $n^{th}$ layer.

According to certain embodiments, the insulating coating comprises at least one intermediate layer, between said at least one electrical conductor and the $n^{th}$ layer of the coating, in particular the $(n-1)^{th}$ layer, which is a homopolymer consisting of a single repeating unit of formula:

(III)

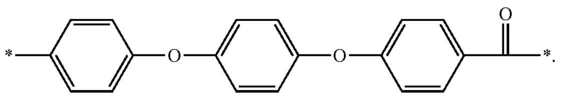

According to certain embodiments, the insulating coating comprises at least one intermediate layer, between said at least one electrical conductor and the $n^{th}$ layer of the coating, in particular the $(n-1)^{th}$ layer, which is a composition comprising a crosslinked thermosetting polymer.

The invention also relates to a process for manufacturing the insulated conductor. The process comprises providing said at least one electrical conductor, covered where appropriate with an insulating coating consisting of (n−1) layers, and providing said composition $C_n$, the composition $C_n$ having a melting temperature $T_m$, The process comprises:

a step of heating the composition $C_n$ at a temperature strictly above $T_m$, so as to obtain a melt of composition $C_n$;

applying the composition $C_n$, in the solid or melt state, on said conductor covered where appropriate with (n−1) layers of insulating coating, so as to obtain a conductor covered with composition $C_n$, in the solid or melt state; and, sufficiently rapid cooling of the melt of composition $C_n$ so as to obtain the $n^{th}$ layer of the coating in pseudo-amorphous form.

The invention further relates to a process for manufacture of heat-welding between two sections of insulated conductor according to the present invention. Both sections have an insulating coating having a peripheral layer formed of the same pseudo-amorphous chemical composition C, the composition C having a glass transition temperature $T_g$, said process comprising:

bringing two sections of insulated conductor into contact;

coalescing the parts of the two sections of insulated conductor brought into contact by heating at a temperature above $T_g$ in order to form an assembly of two coalesced sections; and, crystallizing the composition C of the assembly of the two coalesced sections, by maintaining the heating at a temperature above the temperature $T_g$ of the composition C for a sufficient time.

According to certain embodiments, the composition C is crystallized to a degree of crystallinity strictly greater than 7%, as measured by WAXS, during the crystallization step.

Preferentially, the composition C is crystallized to a degree of crystallinity greater than or equal to 10%, or greater than or equal to 15%, or greater than or equal to 20%, or even greater than or equal to 25%.

The invention also relates to a coil comprising a winding of turns capable of being obtained by:

winding an insulated conductor according to the invention forming a set of turns having areas of contact with one another;

heat-welding of the contact areas by a heat-welding process according to the invention.

LIST OF FIGURES

FIG. 1 represents various cross-sectional shapes of electrical conductor.

FIG. 2 schematically represents an insulated conductor comprising an insulating coating having a single layer.

FIG. 3 schematically represents an insulated conductor comprising an insulating coating having n layers, with n greater than or equal to 2.

FIG. 4 schematically represents an insulated conductor comprising an insulating coating having exactly 2 layers.

FIG. 5 schematically represents the steps of a process for manufacturing an insulated conductor in which the $n^{th}$ layer is produced by extrusion.

FIG. 6 schematically represents the steps of a process for manufacturing an insulated conductor in which the $n^{th}$ layer is produced all by a winding a tape.

FIG. 7 schematically represents the steps of a heat-welding process.

FIG. 8 schematically represents a stack of three heat-welded turns formed from an insulated conductor comprising an insulating coating having a single layer.

FIG. 9 schematically represents a stack of three heat-welded turns formed from an insulated conductor comprising an insulating coating having two layers.

DETAILED DESCRIPTION OF THE INVENTION

Definitions

The term "glass transition temperature", written as Tg, is understood to denote the temperature at which an at least partially amorphous polymer changes from a rubbery state to a glassy state, or vice versa, as measured by differential scanning calorimetry (DSC) according to the standard NF ISO 11357-2: 2020, using a heating rate of 20° C./min. In the present invention, when reference is made to a glass transition temperature, this is more particularly, unless otherwise indicated, the glass transition temperature at step midpoint as defined in this standard. The compositions based on PAEK(s) in the present invention may optionally exhibit several glass transition steps in the DSC analysis, in particular due, where appropriate, to the presence of several different immiscible polymers. In this case, the glass transition temperature is understood to mean the glass transition temperature corresponding to the glass transition step of the PAEK or of the mixture of PAEKs.

The term "melting temperature", written as $T_m$, is understood to denote the temperature at which an at least partially crystallized polymer changes to the viscous liquid state, as measured by differential scanning calorimetry (DSC) according to the standard NF EN ISO 11357-3: 2018, on first heating, using a heating rate of 20° C./min. In the present invention, when reference is made to a melting temperature, it is more particularly, unless otherwise indicated, the peak melting temperature as defined in this standard. The compositions based on PAEK(s) in the present invention may optionally exhibit several melting peaks in the DSC analysis, in particular due, and/or for a given polymer, to the presence of various crystalline forms. In this case, the melting temperature of the composition is understood to mean the melting temperature corresponding to the highest temperature melting peak.

The term "pseudo-amorphous" polymer, respectively "pseudo-amorphous" composition, is understood to denote a polymer, respectively a composition, that is at a temperature below its glass transition temperature in essentially amorphous form. The polymer, respectively the composition, is nevertheless able to crystallize once brought to a temperature above its glass transition temperature for a sufficient period of time. Within the meaning of the invention, a "pseudo-amorphous" polymer, respectively a "pseudo-amorphous" composition, has a degree of crystallinity of from 0% to 7% at a temperature below its glass transition temperature, in particular at 25° C.

The "degree of crystallinity" may be measured by WAXS. By way of example, the analysis can be carried out by wide-angle X-ray scattering (WAXS), on a device of Nano-inXider® type, with the following conditions:

Wavelength: main Kα1 line of copper (1.54 angströms).
Generator power: 50 kV-0.6 mA.
Observation mode: transmission
Counting time: 10 minutes.

A spectrum of the scattered intensity as a function of the diffraction angle is thus obtained. This spectrum makes it possible to identify the presence of crystals, when peaks are visible on the spectrum in addition to the amorphous halo.

In the spectrum, it is possible to measure the area of the crystalline peaks (designated AC) and the area of the amorphous halo (designated AH). The proportion by mass of crystalline PEKK in the PEKK is then estimated using the ratio (AC)/(AC+AH).

The term "mixture of polymers" is understood to denote a macroscopically homogeneous composition of polymers. The term encompasses mixtures of compatible and/or miscible polymers, the mixture having a glass transition temperature intermediate to those of these polymers considered individually. The term also encompasses such compositions composed of mutually immiscible phases dispersed at the micrometric scale.

The term "copolymer" is understood to denote a polymer resulting from the copolymerization of at least two types of monomers which are chemically different, referred to as comonomers. A copolymer is thus formed from at least two repeating units. It can also be formed of three or more repeating units.

The acronym "PAEK" corresponds to the notation "polyaryletherketone", "PAEKs" to "polyaryletherketones" and "PAEK(s)" to "polyaryletherketone" or "polyaryletherketones", where appropriate.

In all the ranges set out in the present patent application, the limits are included, unless otherwise mentioned.

Composition $C_n$ of the Insulated Wire Coating

The composition $C_n$ is a pseudo-amorphous composition, based on polyaryletherketone(s). The at least one polyaryletherketone is a fortiori also in pseudo-amorphous form.

It is the essentially amorphous nature of the composition which enables good coalescence in a heat-welding process. Thus, the at least one polyaryletherketone, respectively the composition $C_n$, advantageously has a degree of crystallinity of less than or equal to 5.0%, or less than or equal to 3.0%, or even less than 1.0%, ideally around 0%.

The composition $C_n$ must have a crystallization rate between $T_m$ and $T_g$ that is slow enough so that it can be melted and then cooled in essentially amorphous form, but fast enough so that it can crystallize in a reasonable time scale once heated between $T_g$ and $T_m$.

Advantageously, the viscosity of composition $C_n$ has a value ranging from 1 to 100 $cm^3$/10 min and preferentially has a value ranging from 2 to 60 $cm^3$/10 min, at 380° C. and under a load of 5 kg, as measured according to standard ASTM D1238-10. These viscosity ranges are particularly advantageous for enabling good coalescence between the layers of composition C during heat welding between several insulated conductors according to the invention. These viscosity ranges are also advantageous for the manufacture of insulated conductors according to the invention by extrusion of the composition $C_n$.

The composition $C_n$ preferentially has a glass transition temperature $T_g$ above or equal to 125° C., more preferably above or equal to 145° C., and extremely preferably above or equal to 150° C.

The composition $C_n$ preferentially has a melting temperature $T_m$ above or equal to 250° C., and more preferably above or equal to 270° C. The composition $C_n$ may in particular have a melting temperature above or equal to 280° C., or above or equal to 290° C., or above or equal to 300° C., or above or equal to 310° C., or above or equal to 320° C., or indeed above or equal to 330° C.

The composition $C_n$ comprises at least 50% by weight of at least one polyaryletherketone. It is equally denoted in the rest of the application as a composition based on polyaryletherketone(s).

A polyaryletherketone (PAEK) comprise units of the following formulae:

(—Ar—X—) et (—$Ar_1$—Y—), wherein:

- Ar and $Ar_1$ each denote a divalent aromatic radical;
- Ar and $Ar_1$ can preferably be chosen from 1,3-phenylene, 1,4-phenylene, 1,1'-biphenylene divalent in positions 3,3', 1,1'-biphenyl divalent in positions 3,4', 1,4-naphthylene, 1,5-naphthylene and 2,6-naphthylene;
- X denotes an electron-withdrawing group; it can preferably be chosen from the carbonyl group and the sulfonyl group;
- Y denotes a group chosen from an oxygen atom, a sulfur atom or an alkylene group, such as —$(CH)_2$— and isopropylidene.

In these X and Y units, at least 50%, preferably at least 70% and more particularly at least 80% of the X groups are a carbonyl group, and at least 50%, preferably at least 70% and more particularly at least 80% of the Y groups represent an oxygen atom.

According to a preferred embodiment, 100% of the X groups denote a carbonyl group and 100% of the Y groups represent an oxygen atom.

The weight of PAEK or, where applicable, the sum of the weights of the PAEKs of the composition $C_n$ may represent at least 60%, or at least 70%, or at least 80%, or at least 85%, or at least 90%, or at least 92.5%, or at least 95%, or at least 99%, or at least 99.9% or 100% of the total weight of the composition.

In certain embodiments, the composition $C_n$ consists essentially of PAEK(s), that is to say that it comprises from 90% to 99.9% of the total weight of the composition as PAEK(s).

In some embodiments, the composition $C_n$ consists of PAEK(s), that is to say that it consists of at least 99.9%, ideally of 100%, of the total weight of the composition as PAEK(s).

Advantageously, the PAEK(s) may be chosen from:

- a polyetherketoneketone, also known as PEKK; a PEKK comprises one or more units of formula: -Ph-O-Ph-C(O)-Ph-C(O)—;
- a polyetheretherketone, also known as PEEK; a PEEK comprises one or more units of formula: -Ph-O-Ph-O-Ph-C(O)—;
- a polyetherketone, also known as PEK; a PEK comprises one or more unit(s) of formula: -Ph-O-Ph-C(O)—;
- a polyetheretherketoneketone, also known as PEEKK; a PEEKK comprises one or more unit(s) of formula: -Ph-O-Ph-O-Ph-C(O)-Ph-C(O)—;

- a polyetheretheretherketone, also known as PEEEK; a PEEEK comprises one or more unit(s) of formula: -Ph-O-Ph-O-Ph-O-Ph-C(O)—;
- a polyetherdiphenyletherketone, also known as PEDEK; a PEDEK comprises one or more unit(s) of formula: a PEDEK comprises one or more unit(s) of formula -Ph-O-Ph-Ph-O-Ph-C(O)—;
- mixtures thereof; and
- copolymers comprising at least two of the abovementioned units, wherein: Ph represents a phenylene group and —C(O)— represents a carbonyl group, it being possible for each of the phenylenes independently to be of ortho (1,2), meta (1,3) or para (1,4) type, preferentially being of meta or para type.

In addition, defects, end groups and/or monomers can be incorporated in a very small amount in the polymers as described in the above list, without, however, having an effect on their performance.

According to certain embodiments, the composition $C_n$ comprises, consists essentially of, or indeed consists of, a polyetherketoneketone polymer comprising: a terephthalic unit and an isophthalic unit, the terephthalic unit having the formula:

(I)

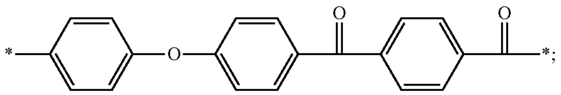

the isophthalic unit having the formula:

(II)

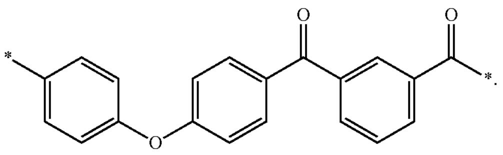

For a polymer of a given family, such as the PEKK family, the term "comprises one or more unit(s)" is understood to mean that this/these unit(s) have a molar proportion of at least 50% in the polymer. This/these unit(s) can represent a molar proportion of at least 60%, or of at least 70%, or of at least 80%, or of at least 85%, or of at least 90%, or of at least 92.5%, or of at least 95%, or of at least 99%, or of at least 99.9% in the polymer. The term "consists essentially of unit(s)" is understood to mean that the unit(s) represent(s) a molar proportion of 95% to 99.9% in the copolymer. Finally, the term "consists of unit(s)" is understood to mean that the unit(s) represent(s) a molar proportion of at least 99.9% in the polymer.

Preferably, the polyetherketoneketone consists essentially of, indeed even consists of: isophthalic "I" and terephthalic "T" units.

Preferably, the polyetherketoneketone is, where appropriate, a random copolymer.

The choice of the molar proportion of T units, relative to the sum of the T and I units, is one of the factors which makes it possible to adjust the rate of crystallization properties of the polyetherketoneketones.

A given molar proportion of T units, relative to the sum of the T and I units, can be obtained by adjusting the respective concentrations of the reactants during the polymerization, in a manner known per se.

The molar proportion of T units relative to the sum of the T and I units of PEKK(s) may notably range from: 0 to 5%; or from 5% to 10%; or from 10% to 15%; or from 15% to 20%; or from 20% to 25%; or from 25% to 30%; or from 30% to 35%; or from 35% to 40%; or from 40% to 45%; or from 45% to 48%; or from 48% to 51%; or from 51% to 54%; or from 54% to 58%; or from 58% to 62%; or from 62% to 65%; or from 65% to 68%; or from 68% to 73%; or from 73% to 75%; or from 75% to 80%; or from 80% to 85%.

According to particular embodiments, the polyetherketone etone consists essentially, or indeed even consists, of "T" and "I" units, with a molar proportion of T units relative to the sum of the T and I units ranging from 45% to 75%. Specifically, for this range of molar proportions, a polyetherketoneketone has an appropriate crystallization rate making it possible on the one hand to be obtained in essentially amorphous form by means of sufficiently fast cooling and to crystallize sufficiently fast once heated above its glass transition temperature. These molar proportions of T units relative to the sum of the T and I units are therefore particularly appropriate for compositions $C_n$ consisting essentially, or indeed consisting, of a single polyetherketoneketone. The molar proportion of T units relative to the sum of the T and I units is preferentially from 48% to 75% and very preferably from 58% to 73%. The molar proportion of T units relative to the sum of the T and I units may in particular be around 60% or around 70%.

The composition $C_n$ preferentially does not consist of a polyetheretherketone homopolymer consisting of a single repeating unit of formula:

(III)

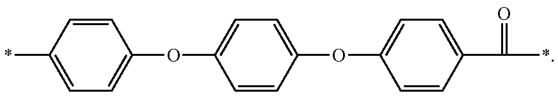

This is because this polymer crystallizes very rapidly when it is heated above its Tg, which makes good layer-to-layer coalescence very difficult.

Starting from this observation, it can nevertheless be envisaged to reduce the crystallization rate of the above homopolymer in various ways.

A first aspect is the introduction of a certain number of defects in the structure of the homopolymer consisting of the unit of formula (III), that is to say a modification of its chemical structure.

The composition $C_n$ may comprise, consist essentially of, or indeed consist of, a polymer comprising a unit of formula:

(III)

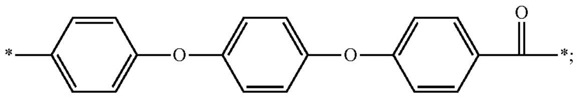

and a unit of formula:

(IV)

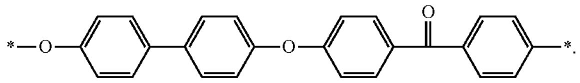

Preferentially, the copolymer consists essentially of, or indeed even consists of: units of formulae (III) and (IV).

Preferentially, the polymer is, where appropriate, a random copolymer.

The molar proportion of (III) units relative to the sum of the (III) and (IV) units may range from 0% to 99%, preferentially from 0% to 95%.

According to certain variants, the composition may comprise, consist essentially of, or indeed consist of, a polymer comprising, consisting essentially of, or indeed even consisting of:

a unit of formula:

(III)

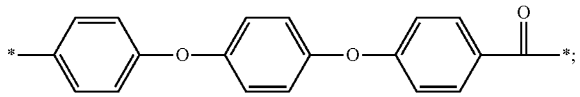

and a unit of formula:

(IVa)

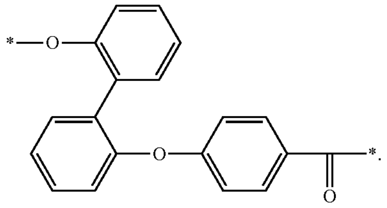

Preferentially, the polymer consists essentially of, or indeed even consists of: units of formulae (III) and (IVa).

Preferentially, the polymer is, where appropriate, a random copolymer.

The molar proportion of (III) units relative to the sum of the (III) and (IVa) units may range from 0% to 99%, and preferentially from 5% to 95%.

The composition $C_n$ may comprise, consist essentially of, or indeed consist of, a polymer comprising a unit of formula:

(III)

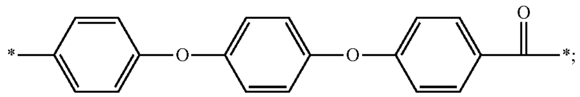

and a unit of formula:

(V)

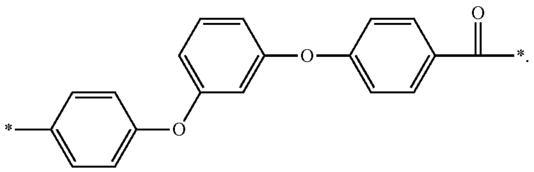

According to certain variants, the composition $C_n$ may comprise, consist essentially of, or indeed consist of, a polymer comprising, consisting essentially of, or indeed even consisting of:

a unit of formula:

(III)

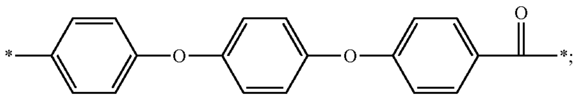

and a unit of formula:

(Va)

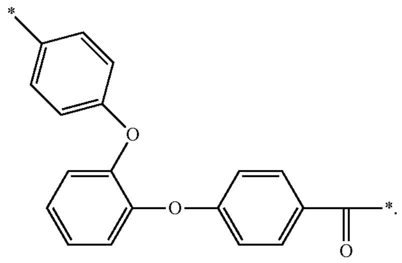

The molar proportion of (III) units relative to the sum of the (III) and (Va) units may range from 0% to 99%, and preferentially from 5% to 95%.

Preferentially, the polymer consists essentially of, or indeed even consists of: units of formulae (III) and (Va).

Preferentially, the polymer is, where appropriate, a random copolymer.

The molar proportion of (III) units relative to the sum of the (III) and (Va) units may range from 0% to 99%, and preferentially from 0% to 95%.

A second aspect for reducing the crystallization of a homopolymer consisting of the repeating unit of formula (III) is to mix it with another PAEK which takes longer to crystallize. This other PAEK may in particular be a PEKK consisting essentially, preferably consisting, of I unit and/or of T unit.

A third aspect for reducing the crystallization rate of a PEEK homopolymer consisting of the repeating unit of formula (III) is to mix it with another polymer other than a PAEK, in particular an amorphous polymer. One amorphous polymer that is compatible with many PAEKs, in particular with a PEKK or a PEEK, is for example a polyetherimide.

A fourth aspect, not expanded upon in detail here, for reducing the crystallization of a PEEK homopolymer consisting of the repeating unit of formula (III) would be the addition of an additive acting as a crystallization rate modulating agent.

According to certain particular embodiments, the composition $C_n$ in particular consists essentially, or consists, of a single PAEK chosen from:

a PEKK, in particular consisting essentially, or consisting, of I and T units, as described above;

a polymer consisting essentially, or consisting, of units of formula (III) and (IV), as described above; and, a polymer consisting essentially, or consisting, of units of formula (III) and (V), as described above.

According to certain embodiments, the composition $C_n$ comprises, consists essentially of, or consists of, a single PAEK, of substantially homogeneous composition and/or viscosity.

According to certain embodiments, the composition $C_n$ comprises, consists essentially of, or consists of, several different PAEKs, that is to say in particular having a different chemical composition and/or a different viscosity.

According to certain particular embodiments, the composition $C_n$ comprises at least two PAEKs of different chemical composition, more particularly:

a PEKK, in particular consisting essentially, or consisting, of I and T units, as described above, and in addition to this PEKK, at least one of the following polymers: PEK, PEEKEK, PEEK, in particular a polymer consisting essentially, or consisting, of units of formula (III) and (V) as described above, PEEKK, PEKEKK, PEEEK, PEDEK, or a polymer consisting essentially, or consisting, of units of formula (III) and (IV) as described above, with a content of less than 50% by weight of the total weight of the composition $C_n$, preferably less than or equal to 30% by weight of the composition $C_n$.

According to certain particular embodiments, the composition $C_n$ comprises a mixture of several PAEKs, the PAEKs being a copolymer of PAEK with different molar proportions of repeating units. In particular, the composition $C_n$ may comprise a mixture of copolymers of PEKKs having a different molar ratio of "T-type" units relative to the sum of the "T-type" and "I-type" units. The composition $C_n$ may also comprise a mixture of copolymers comprising, consisting essentially, or indeed even consisting, of units of formula (III) and units of formula (IV), respectively of formula (V), having a different molar ratio of units of formula (III) relative to the sum of the units of formula (III) and of formula (IV), respectively relative to the sum of the units of formula (III) and of formula (V).

According to certain particular embodiments, the composition $C_n$ may also comprise a mixture of several PAEKs, the PAEKs being a copolymer of PAEK with different viscosities.

Finally, the composition $C_n$ may also comprise a mixture of copolymers of PAEKs, the PAEKs being a copolymer of PAEK with different molar proportions of repeating units and different viscosities.

According to certain embodiments, the composition $C_n$ may further comprise one or more other polymers not belonging to the family of the PAEKs, in particular other thermoplastic polymers.

According to certain embodiments, the composition $C_n$ comprises a mixture of PAEK(s) with at least one fluoropolymer, such as the fluoropolymers described in application EP 2 767 986 and U.S. Pat. No. 9,543,058. The fluoropolymer can preferentially be chosen from the list consisting of: a polytetrafluoroethylene (PTFE), a poly(vinyl fluoride) (PVF), a poly(vinylidene fluoride) (PVDF), a polychlorotrifluoroethylene (PCTFE), a perfluoroalkoxy polymer, a perfluoroalkoxy-alkane copolymer (PFA), a fluorinated ethylene-propylene copolymer (FEP), a poly(ethylene-co-tetrafluoroethylene) (ETFE), polyethylenechlorotrifluoroethylene (ECTFE), a perfluorinated elastomer (FFKM), a perfluoropolyether (PFPE), and their mixture.

Since fluoropolymers are generally immiscible with PAEKs, the composition $C_n$ is, in these embodiments, advantageously a dispersion of fluoropolymer particles in said at least one PAEK.

According to certain embodiments, the composition $C_n$ comprises a mixture of PAEK(s) and a polyetherimide (PEI), a silicone-polyimide copolymer or else a polysiloxane/polyimide block copolymer (such as a polyetherimide/polydimethylsiloxane (PEI/PDMS)), such as the polymers described in the applications EP 0 323 142 and U.S. Pat. No. 8,013,251.

According to certain embodiments, the composition $C_n$ may comprise alternatively to or in addition to the aforementioned thermoplastics: a polyphenylene sulfone (PPSU), a polysulfone (PSU), a polycarbonate (PC), a polyphenylene ether (PPE), a poly(phenylene sulfide) (PPS), a poly(ethylene terephthalate) (PET), a polyamide (PA), a polybenzimidizole (PBI), a poly(amide-imide) (PAI), a poly(ether sulfone) (PES), a poly(aryl sulfone), a poly(ether imide sulfone), a polyphenylene, a polybenzoxazole, a polybenzothiazole, and their mixture. According to certain particular embodiments, the composition $C_n$ consists essentially, or consists, of a mixture of:

PAEK chosen from: a PEKK, in particular consisting essentially, or consisting, of I and T units, as described above; a polymer consisting essentially, or consisting, of units of formula (III) and (IV), as described above; and a polymerconsisting essentially, or consisting, of units of formula (III) and (V), as described above;

with another polymer chosen from the list consisting of:

FEP, PFA, FFKM, PEI, PEI/PDMS, PES, PSU, PPSU, PPS, PPE and their mixture.

The composition $C_n$ may in particular consist essentially, or consist, of a mixture of:

PEKK, consisting essentially, or consisting, of I and T units, in which the molar proportion of T units relative to the sum of the T and I units ranges from 45% to 75%;

with another polymer chosen from the list consisting of: FEP, PFA, FFKM, PEI, PEI/PDMS, PES, PSU, PPSU, PPS, PPE and their mixture.

According to some embodiments, the composition can additionally comprise fillers and/or additives.

Among the fillers, mention may be made of reinforcing fillers. The composition can thus comprise less than 50% by weight of fillers, preferably less than 40% by weight of fillers and more preferably less than 25% by weight of fillers, with respect to the total weight of the composition.

Among the additives, mention may be made of stabilizers (light, in particular UV, and heat stabilizers, such as for example phosphate salts), optical brighteners, dyes, pigments, flow agents, additives for adjusting the viscosity of the composition in the melt state, additives for adjusting the crystallization rates of the composition, additives for adjusting the heat capacity of the composition, or a combination of these additives. The composition may thus comprise less than 10% by weight, preferably less than 5% by weight and more preferably less than 1% by weight of additive(s), relative to the total weight of the composition.

Structure of the Insulated Wire

With reference to FIGS. 2, 3 and 4, the insulated conductor (1; 10) according to the invention comprises:

at least one electrical conductor (2; 12); and, an insulating coating (5; 11) covering said electrical conductor, consisting of n layer(s) (5; 13; 14; 15), “n” being an integer greater than or equal to 1.

The number of layers is increasing from the center toward the periphery. The outermost layer, or $n^{th}$ layer, consists of a composition $C_n$ as described above. The insulating coating, or respectively each layer of the insulating coating and in particular the $n^{th}$ layer, advantageously has a dielectric constant, as measured at 25° C. and at 1 KHz, of less than or equal to 3.5, preferentially less than or equal to 3.3, and extremely preferably less than or equal to 3.1, as measured according to the IEC 62634-2-1:2018 standard.

The insulating coating, or respectively each layer of the insulating coating and in particular the $n^{th}$ layer, has an average thickness ranging from 5 micrometers to 1000 micrometers, preferentially from 10 micrometers to 750 micrometers, more preferentially from 25 micrometers to 500 micrometers, and extremely preferably from 50 micrometers to 250 micrometers. The thickness can be measured on sections of insulated conductor by microscopy or by any other method known to those skilled in the art.

The thickness of each layer of the insulating coating, and in particular the thickness of the $n^{th}$ layer, is advantageously relatively homogeneous. The ratio defined by the smallest thickness to the greatest thickness, for a given layer, is preferably at least 0.75, or at least 0.8, or at least 0.85, or at least 0.9 or at least 0.95 over substantially the entire area of the insulated conductor.

The electrical conductor is generally of elongated shape along one axis. Within the meaning of the invention, the electrical conductor means a single electrical conductor or else a roving consisting of several electrical conductors.

A cross section of the electrical conductor, normal to the conductive axis, can have any geometric shape, and in particular with reference to FIG. 1, a shape that is: square (a), rectangular (b) with optionally rounded edges (c; d), circular (e) or elliptical (f).

An electrical conductor is understood to mean a material having a high conductivity measured at 20° C., in particular a conductivity greater than or equal to $5\times10^6$ S/m, preferentially greater than or equal to $1\times10^7$ S/m and extremely preferably greater than or equal to $3\times10^7$ S/m.

The electrical conductor may in particular comprise a metal chosen from: copper, aluminum, gold, silver, nickel, tin.

According to certain embodiments, the electrical conductor may be a pure metal, for example copper, aluminum, gold, silver or nickel.

According to certain embodiments, the electrical conductor may be an alloy, such as for example a copper-tin alloy (bronze), a copper-nickel alloy, a copper-zinc alloy, or else a silver-copper alloy.

According to certain embodiments, the electrical conductor may have a core-shell structure, the core consisting of a first electrical conductor and the shell surrounding the core consisting of a second conductor, this structure making it possible to make use of the advantageous properties of each electrical conductor. The electrical conductor may in particular consist of an aluminum core (lightness) and a copper shell (good conduction properties). The size of the shell may in particular be very thin compared to the size of the core: it is then referred to as plating. The electrical conductor may in particular consist of silver-plated copper or nickel-plated copper.

According to certain embodiments, the electrical conductor consists of copper or, where appropriate, comprises a copper shell.

For electrical conductors capable of oxidation, the outer surface of the conductor may optionally have an oxidation layer. Too thick an oxidation layer is generally undesirable because it tends to reduce the adhesion of the insulating coating to the electrical conductor. In the present invention, reference is generally made to the material of the electrical conductor, such as copper, without it being assumed a priori what form its outer surface in contact with the insulating coating is in. Thus an electrical conductor consisting of copper may or may not have an oxidation layer on its outer surface, when the state of its outer surface is not explicitly specified.

According to certain embodiments, in particular those where the outer surface is copper or aluminum, in particular copper, the thickness of the oxidation layer is less than or equal to 300 μm and preferentially less than or equal to 200 μm. The thickness of the oxidation layer may in particular be less than or equal to 150 μm, or less than or equal to 100 μm, or less than or equal to 50 μm, or less than or equal to 25 μm, or less than or equal to 10 μm, or else less than or equal to 5 μm. According to certain embodiments, the outer surface of the electrical conductor has no, or essentially no, oxidation layer.

The electrical conductor is covered, except optionally at its ends, with an insulating coating consisting of n layers.

According to certain embodiments, such as the one represented in FIG. 2, the insulated conductor 1 consists of an electrical conductor 2 and an insulating coating consisting only of a single and unique layer 5, the layer 5 being of composition $C_1$ and covering the electrical conductor 2.

According to certain embodiments, such as those represented in FIGS. 3 and 4, the insulated conductor 10 consists of an electrical conductor 12 and an insulating coating 11 comprising at least two layers: an $n^{th}$ layer 15, the outermost, and one or more intermediate layers (13, 14) between the electrical conductor 12 and the $n^{th}$ layer 15.

With reference to FIG. 3, if the integer n is strictly greater than 2, the electrical conductor 12 is covered, in increasing order of the layers from the center toward the periphery, with (n−2) intermediate layers 13, with one $(n-1)^{th}$ layer 14 and one $n^{th}$ layer 15.

With reference to FIG. 4, if the integer n is equal to 2, the $(n-1)^{th}$ layer 14 is then the only intermediate layer, at the direct interface between the electrical conductor 12 and the $n^{th}$ layer 15.

The presence of intermediate layers is optional, nevertheless it can have several advantages.

According to certain embodiments, a base layer $C_1$ can in particular be useful in order to ensure, where appropriate, better adhesion between the insulating coating and the electrical conductor.

According to certain embodiments, certain intermediate layers, in particular the $(n-1)^{th}$ layer, can be formulated to soften substantially less than the $n^{th}$ layer, or even not to soften at all, during the heat welding process between two sections of insulated conductors. This makes it possible to prevent any risk of the electrical conductors of two sections of insulated conductor coming into contact during heat welding.

In a first embodiment, certain intermediate layers, in particular the $(n-1)^{th}$ layer, are in semicrystalline form, and comprise, consist essentially of, or consist of, a thermoplastic polymer having a melting point above or equal to that of the $n^{th}$ layer (the $n^{th}$ layer being in pseudo-amorphous form; it may be that a melting point is not always directly measurable on first heating with a ramp of 20° C./min; in this case, the sample used in DSC can be heated long enough above the glass transition temperature $T_g$ of the composition $C_n$, so as to crystallize, in order to be able to determine a melting temperature).

The $(n-1)^{th}$ layer can be of the same chemical composition as that of the composition $C_n$, but unlike $C_n$ in the $n^{th}$ layer, be in semicrystalline form.

The $(n-1)^{th}$ layer may have a different chemical composition than the composition $C_n$. In certain embodiments, the thermoplastic polymer of the $(n-1)^{th}$ layer can be another PAEK. In particular, the composition $C_n$ can consist of a polyetheretherketone homopolymer consisting of a single repeating unit of formula (III). In other embodiments, the thermoplastic polymer of the $(n-1)^{th}$ layer can be a polymer other than a PAEK.

In a second embodiment, certain intermediate layers, in particular the $(n-1)^{th}$ layer, comprise, consist essentially of, or consist of, a crosslinked thermosetting polymer. The thermosetting polymer can in particular be chosen from the list consisting of: polyurethanes, polyesters, polyesterimides, polyetherimides, polyamides, polyimides, polyamide-imides and mixtures thereof.

Process for Manufacturing the Insulated Conductor

A process for manufacturing the insulated conductor comprises:

- providing an electrical conductor;
- providing composition(s) for n layer(s) intended to form an insulating coating; and
- applying the compositions to the insulated conductor so as to form n layer(s) forming an insulating coating and adhering to the electrical conductor.

With reference to FIGS. 5 and 6, the process may comprise a first step 100 of forming the electrical conductor in order to obtain an electrical conductor with the required dimensions. The diameter and/or more generally the dimensions of the wires can be adjusted by cold forming processes, in particular drawing and/or rolling, or by extrusion processes.

The process may comprise a second step of cleaning 110 and/or modifying the surface appearance of the electrical conductor. This step makes it possible in particular to remove coarse soiling from the electrical conductor, and/or to control the surface roughness, and/or to control the thickness of the oxide layer, where appropriate.

This step may in particular comprise at least some of the following treatments:

- chemical pre-cleaning, for example using appropriate solvents or acids;
- mechanical pre-cleaning, for example polishing;
- plasma treatment in a protective gaseous atmosphere of nitrogen, argon or hydrogen, as described in application CA 3 019 024, this treatment making it possible, according to certain embodiments, to remove the oxide layer.

The various layers of the insulating coating can be produced one by one, or in certain cases and for at least two successive layers simultaneously, by the usual techniques of "enamelling" electrical conductors. These techniques include in particular extrusion, powder coating processes, liquid impregnation processes, or else the winding of tapes around the electrical conductor.

At 120 in FIGS. 5 and 6, the production, where appropriate, of various intermediate layers is not explained further below, their composition possibly being of very diverse nature and their method of production generally being known to those skilled in the art.

The production, where appropriate, of various intermediate layers 120 is not explained further below, their composition possibly being of very diverse nature and their method of production generally being known to those skilled in the art. The following embodiments illustrate the production of the $n^{th}$ layer of the insulating coating, and where appropriate of the $(n-1)^{th}$ layer, if the latter is produced simultaneously with the $n^{th}$ layer.

The production of the $n^{th}$ layer of the insulating coating comprises:

- a step 130 of heating the composition $C_n$ at a temperature strictly above the melting temperature of the composition, so as to obtain a melt of composition $C_n$;
- at 140 in FIGS. 5 and 6, applying the composition Cn, in the solid or melt state, on said conductor covered where appropriate with (n−1) layers of insulating coating, so as to obtain a conductor covered with composition Cn, in the solid or melt state; and,
- at 150 in FIGS. 5 and 6, sufficiently rapid cooling of the melt so as to obtain the nth layer of the coating layer in pseudo-amorphous form.

According to certain embodiments (FIG. 5), the $n^{th}$ layer can be produced by extrusion of the composition $C_n$ on the electrical conductor, covered where appropriate with an insulating coating of (n−1) layers. The extrusion temperature of the composition $C_n$ is preferentially from $(T_m+5°)$ C. to $(T_m+100°)$ C. and extremely preferably from $(T_m+10°)$ C. to $(T_m+75°)$ C.

According to certain embodiments (FIG. 6), the $n^{th}$ layer can be produced by winding tapes of composition $C_n$ around the electrical conductor, covered where appropriate with an insulating coating of (n−1) layers. The winding of tapes of composition $C_n$ is then melted by any suitable heating means.

The $n^{th}$ layer of molten coating can then be cooled by contact with a cooling fluid, in liquid or gaseous form, by forced or free convection, fora certain period of time. According to certain embodiments, the $n^{th}$ layer of molten coating is cooled by immersion in a water tank. The temperature of the water can be adjusted by recycling of the liquid. The cooling rate can be adjusted by controlling the temperature of the water and/or the length of the water tank.

According to certain embodiments, the $n^{th}$ layer of molten coating is cooled in air, in particular by forced air convection.

Depending on the crystallization properties of the composition $C_n$, a person skilled in the art would know how to choose the most appropriate cooling method to obtain sufficiently rapid cooling of the melt so that the $n^{th}$ layer of the coating is in pseudo-amorphous form.

In certain embodiments, the integer "n" is equal to 1. In these embodiments, the electrical conductor can advantageously be brought to a temperature close to, generally below, the melting temperature of the composition $C_1$ in order to improve the adhesion with the composition $C_1$. The electrical conductor can for example be brought to a temperature above or equal to 200° C., or above or equal to 225° C., or above or equal to 250° C., or above or equal to 275° C., or else above or equal to 300° C.

In the embodiments where the electrical conductor has undergone plasma treatment to remove the oxide layer therefrom, the step of producing the layer of composition $C_1$ is also carried out under a protective atmosphere so as to prevent a new form of oxide from reforming.

In certain embodiments, the integer "n" is greater than or equal to 2. In these embodiments, the $(n-1)^{th}$ layer and the $n^{th}$ layer can advantageously be extruded by a co-extrusion or tandem extrusion process. In the particular case where the integer n is equal to two, the two layers of the insulating coating can be extruded simultaneously, preferentially onto the preheated electrical conductor, as explained in one of the embodiments above.

Heat Welding Process

A heat welding process comprises:

- providing two sections of insulated conductor according to the invention having a peripheral layer formed of the same pseudo-amorphous chemical composition C, the composition C having a glass transition temperature $T_g$ and a melting temperature $T_m$;
- bringing two sections of insulated conductor into contact; and,
- heating the two sections of insulated conductor brought into contact.

In certain embodiments, the two conductor sections may be derived from a single insulated conductor.

In certain embodiments, the two conductor sections may be derived from two different insulated conductors. These insulated conductors may or may not have the same structure, as long as the peripheral layer of their insulating coating is formed of the same chemical composition, C, which is in a pseudo-amorphous form.

With reference to FIG. 7, the heat welding process comprises a first step 200 of bringing two sections of insulated conductor into contact. A certain pressure can advantageously be exerted on the two sections of insulated conductor so as to establish and maintain good contact between the two sections of insulated conductor.

The heat-welding process further comprises a second step 210 of coalescing the parts of the two sections of insulated conductor brought into contact, to form an assembly of two coalesced sections; and, a third step 220 of crystallizing the composition C of the assembly of the two coalesced sections, by heating the contact area at a temperature above $T_g$.

When composition C is heated at a temperature above $T_g$, it softens without initially causing substantial crystallization, which allows the coalescence of the peripheral layers of the two sections of insulated conductor.

Maintaining the two coalesced sections at a temperature above $T_g$ long enough makes it possible to crystallize the composition C to the desired degree of crystallinity.

The heating of the contact area can in particular be carried out by hot-air blowing, or in a furnace, or else by circulating a current through the electrical conductor (resistance heating).

According to certain embodiments, the heating of the contact area is carried out at a temperature above or equal to $(T_g+20°)$ C., preferentially at a temperature above or equal to $(T_g+30°)$ C.

According to certain embodiments, the heating of the contact area is carried out at a temperature below or equal to $(T_m-5°)$ C., preferentially at a temperature below or equal to $(T_m-10°)$ C.

According to certain embodiments, the heating of the contact area is carried out at a temperature ranging from $(T_g+T_m)/2$ to $T_m$.

According to advantageous embodiments, the use of a certain pressure on the two sections of insulated conductors makes it possible to reduce the heating temperature of the contact area.

According to certain embodiments, the sufficiently long heating of the contact area makes it possible to achieve a degree of crystallinity strictly greater than 7%, as measured by WAXS. Preferentially, it makes it possible to achieve a degree of crystallinity greater than or equal to 10%, or greater than or equal to 15%, or greater than or equal to 20%, or indeed greater than or equal to 25%.

Winding

The insulated conductor according to the invention can be wound to form a winding forming a set of turns having areas of contact with one another; These turns can be welded to one another by the heat-welding process according to the invention.

According to certain embodiments, the heat welding of the turns can be carried out concomitantly with the winding process by means of a jet of hot air.

FIGS. 8 and 9 schematically illustrate two particular embodiments of a stack of three turns.

FIG. 8 represents a stack 30 of three turns, made from an insulated conductor for which n is equal to 1. The electrical conductors 2 are held together and insulated from one another by a matrix 8 of composition $C_1$.

FIG. 9 represents a stack 40 of three turns, made from an insulated conductor for which n is equal to 2. The electrical conductors 12 are insulated by a layer 14 of composition $C_1$ and a matrix 18 of composition $C_2$, the matrix of composition $C_2$ also ensuring the holding together of the turns.

EXAMPLES

Example 1: Insulated Copper Wires Sheathed with a Single Layer of PEKK

The manufacture of a copper wire sheathed with a single layer of insulation was carried out by a continuous process of melt extrusion of a PEKK around said wire.

A coil of copper wire with a diameter of 1 mm, obtained by drawing a standard copper wire to the desired dimension, was used.

The surface finish of the copper wire was rough and contained residues of drawing oil, the latter had initially been degreased with ethanol.

Several PEKKs were compared, notably:

- a PEKK from the KEPSTAN® 6000 range, P1, manufactured by Arkema, having a melt flow index of 37 $cm^3$/10 min at 380° C., under a load of 5 kg. The polymers of the KEPSTAN® 6000 range are PEKKs consisting of terephthalic and isophthalic units, the molar percentage of terephthalic units relative to the sum of the terephthalic and isophthalic units being around 60%.
- two PEKKs from the KEPSTAN® 7000 range, P2 and P3, manufactured by Arkema, having a melt flow index at 380° C., under a load of 5 kg, of: 37 $cm^3$/10 min and 65 $cm^3$/10 min, respectively. The polymers of the KEPSTAN® 7000 range are PEKKs consisting of terephthalic and isophthalic units, the molar percentage of terephthalic units relative to the sum of the terephthalic and isophthalic units being around 70%.

The coil was placed on a creel in order to exert a slight tension on the wire.

The wire was set in motion by a pulling roller making it possible to generate a constant run velocity "$V_d$".

The wire was heated by passing in front of a heat gun, the setpoint temperature of which was set at 500° C.

The wire was then conveyed into a coating head, fed by a single-screw extruder placed perpendicular to the axis of movement of the wire, then the wire was coated with molten polymer.

In order to feed the single-screw extruder, the polymer was dried for 12 h at 150° C. The polymer was then introduced into a hopper placed upstream of the extruder, then conveyed and melted along the screw then passed through the coating head before leaving from a circular die with a diameter greater than the diameter of the copper wire in order to coat the this moving copper wire. The extrusion temperature is denoted "$T_e$".

Following the coating operation, the polymer was then cooled in air during the conveying thereof and the sheathed wire was wound onto an adaptive speed winder.

Their pseudo-amorphous state was confirmed by DSC, a quick and simple method to implement, an alternative to X-ray measurement. The DSC analysis was carried out according to the standard NF EN ISO 11357-3:2018, in first heat, using a heating rate of 20° C./min, by identifying the absence of a melting peak or by identifying a cold crystallization peak.

The mean thickness "th" of the sheath was able to be measured on a cross section of enamelled wire by electron microscopy.

Table 1 groups together the values of the various parameters mentioned previously:

TABLE 1

| Polymer | $V_d$ (m/min) | $T_e$ (° C.) | th (μm) | State |
|---|---|---|---|---|
| P1 | 10 | 330 | 77 | Pseudo-amorphous |
| P2 | 10 | 350 | 102 | Pseudo-amorphous |
| P3 | 13.3 | 350 | 69 | Pseudo-amorphous |

Example 2: Insulated Copper Wire Sheathed with Two Layers of PEKK

The wire sheathed with a pseudo-amorphous P2 polymer layer obtained in example 1 was able to be annealed by heating at a temperature ranging from 190° C. to 310° C., for example at a temperature of 250° C., for a sufficient period of time, preferentially from 1 minute to 30 minutes, for example for 5 minutes, so as to crystallize.

The wire sheathed with a crystallized P2 polymer layer was then able to be covered with a layer of molten P1 polymer by extrusion, then cooled in air so that P1 is in pseudo-amorphous form.

Example 3: Film Adhesion

PEKK films were prepared by a cast film extrusion method.

Several PEKKs were compared, notably:

the polymers P1 and P2 from example 1; and a PEKK from the KEPSTAN® 8000 range, P4, manufactured by Arkema, having a melt flow index of 37 $cm^3$/10 min at 380° C., under a load of 5 kg. The polymers of the KEPSTAN® 8000 range are PEKKs consisting of terephthalic and isophthalic units, the molar percentage of terephthalic units relative to the sum of the terephthalic and isophthalic units being around 80%.

Pseudo-amorphous films of composition P1, P2 and P4 were thus able to be prepared, denoted below: "F-P1_am", "F-P2_am" and "F-P4_am".

Two films of the same chemical composition and of thickness "th" were brought into contact, except at their ends, then heated for two minutes at a temperature "T".

Their adhesion was evaluated (see Table 2) empirically after cooling, by trying to separate the two films by hand from their ends which had not been brought into contact. In the table "n" means "no adhesion", "w" weak adhesion and "g" good adhesion.

Their pseudo-amorphous appearance ("Am") or, on the contrary, crystalline appearance ("C") was able to be confirmed by DSC (see Table 3).

The expression "n/a" means that no measurement was made.

TABLE 2

| | Th | T(° C.) | | | | | | | |
|---|---|---|---|---|---|---|---|---|---|
| Assembly of films | (μm) | 180 | 220 | 240 | 285 | 310 | 320 | 330 | 340 |
| F-P1_am/F-P1_am | 100 | g | g | g | g | n/a | | | |
| F-P2_am/F-P2_am | 50 | W | w | w | w | w | g | n/a | |
| F-P4_am/F-P4_am | 100 | n | n | n | n | n | W | g | g |

TABLE 3

| | T(° C.) | | | | | | | |
|---|---|---|---|---|---|---|---|---|
| Assembly of films | 180 | 220 | 240 | 285 | 310 | 320 | 330 | 340 |
| F-P1_am/F-P1_am | Am | Am | Am | Am | n/a | | | |
| F-P2_am/F-P2_am | Am | C0 | C | C | C | C | n/a | |
| F-P4_am/F-P4_am | | | | | n/a | C | C | C |

In view of the results presented in tables 2 and 3, it can be seen that:

the F-P1_am/F-P1_am assembly has good adhesion for a wide range of temperatures: 180-285° C., but it did not have time to crystallize during the short period for which it was heated. Given the properties of the polymer P1, the F-P1_am/F-P1_am assembly could however crystallize if it were heated, for example at 285° C., for a longer period of time, for example 20 minutes;

the F-P2_am/F-P2_am assembly exhibits good adhesion at 320° C. and is obtained in crystallized form by heating for 2 minutes. According to the tests carried out, a weak adhesion was also able to be obtained for a wide range of temperatures: 180-285° C.

the F-P4_am/F-P4_am assembly exhibits good adhesion at 330-340° C. and is obtained in crystallized form by heating for 2 minutes.

These three polymers are therefore pseudo-amorphous polymers which can be used as the outermost layer of an insulating coating of an insulated conductor according to the invention. Given the criteria of interest to those skilled in the art during the practical implementation of a heat welding process: i) adhesion (desired to be the best possible), ii) crystallinity (desired to be sufficient), iii) heating temperature (desired to be as low as possible), iv) duration of the crystallization step (desired to be sufficiently short), and any other processing constraint that occur to them, they could choose one or other of these polymers. The polymers P1 and P2 seem the most suitable for obtaining heat welding that has good adhesion and sufficient crystallinity at a relatively moderate heat-welding temperature. However, polymer P1 crystallizes less rapidly than polymer P2.

Polymer P3 can also be used, but requires a higher heating temperature and its faster crystallization rate than that of polymer P2 makes the use thereof slightly more difficult.

Example 4: Adhesion of Insulated Wires

To determine the weldability of the insulated wires sheathed with a layer of PEKK, tests #1 to #8 were carried out by trying to heat weld two wires having a sheath of the same composition P2 or P4, with various heating temperatures and contacting pressures, and a contacting time under these different temperature and pressure conditions.

Copper wires with a diameter of 3 millimeters were coated, according to the production method of example 1, with the polymers P2 and P4 from example 1, so as to obtain insulated wires sheathed by a layer of PEKK having a mean thickness approximately equal to 75 micrometers.

The wires used for tests #1 to #7 were obtained in pseudo-amorphous form by air cooling as in example 1.

The wires used for test #8 (comparative) were manufactured like those for tests #5 to #7, except that the PEKK layer of the insulating sheath was crystallized in line by heating the copper wire.

For contacting at different pressures, two portions of identical wires with the length of 5 cm were introduced into a steel holding device (adjustable to the width of a wire), movable only in the vertical axis. The wires were arranged one on top of the other along the vertical axis, offset, with a contact length "l". The holding device described above was placed in a Carver press with heated platens set at a heating temperature "T", expressed in degrees Celsius, and at a pressure "P", expressed in metric tons (mT). The device was maintained under these pressure and temperature conditions for 20 minutes. The device was then removed and left to cool to room temperature (23° C.).

The two-wire system thus obtained was then characterized. The degree of adhesion was estimated by carrying out a shear test of the interface on a Zwick tensile tester at a speed of 5 mm/min. The measured adhesion "Adh" corresponds to the pull-out force "F" normalized by the contact length "l".

The results of the various tests are presented in Table 4 below:

TABLE 4

| | Insulating layer of the wire | | Heat welding conditions | | | Adhesion test | | |
|---|---|---|---|---|---|---|---|---|
| Tests | Polymer | Initial state before heat welding | T (° C.) | t (min) | P (mT) | l1 (mm) | F(N) | Adh (N/mm) |
| #1 | P2 | pseudo-amorphous | 200 | 20 | 1 | 37.5 | 283 | 7.5 |
| #2 | P2 | pseudo-amorphous | 220 | 20 | 1 | 33.5 | 331 | 9.9 |
| #3 | P2 | pseudo-amorphous | 230 | 20 | 0.5 | 36 | 604 | 16.8 |
| #4 | P2 | pseudo-amorphous | 250 | 20 | 1 | 39.5 | 459 | 11.6 |
| #5 (comparative) | P4 | pseudo-amorphous | 230 | 20 | 1 | 39 | * | * |
| #6 (comparative) | P4 | pseudo-amorphous | 230 | 20 | 0.5 | 39 | * | * |
| #7 | P4 | pseudo-amorphous | 200 | 20 | 0.2 | 31.5 | 60 | 1.9 |
| #8 (comparative) | P4 | crystalline | 200 | 20 | 0.2 | ** | ** | ** |

* Very weak adhesion, the wires separate while the test is being set up
** No adhesion The tests show that for wires with a pseudo-amorphous insulating layer made of to polymer P2 (moderate crystallization rate) and with a pressure of 0.5 to 1 mT (tests #1 to #4), it is possible to strongly adhere the wires to one another over a wide range of temperatures, and this being at well below the melting point of the polymer of the insulating layer. The highest adhesion values are obtained for a compression temperature of 230° C. which, without being bound by theory, could correspond according to the inventors to an optimum in terms of polymer mobility for generating adhesion but also a crystallization rate slow enough to allow time to generate the latter as best possible.

For an insulating layer made of polymer P4 (high crystallization rate) in the pseudo-amorphous state, it is also possible to generate adhesion but the window of temperatures and pressures seems narrower and the adhesion levels remain low at the pressures used in the tests (see test #7 and comparative tests #5 and #6).

By extension, PAEKs with an even higher crystallization rate such as the homopolymer consisting of repeating units of formula (III) seem to be even less suitable than the polymer P4.

As can be seen with comparative test #8, if the insulating layer is already in the crystalline state, it is impossible to make the wires adhere to one another in these temperature ranges.

The invention claimed is:

1. An insulated conductor comprising:

at least one electrical conductor; and, an insulating coating covering said electrical conductor, consisting of n layer(s), "n" being an integer greater than or equal to 1, the nth layer being the outermost layer consisting of a pseudo-amorphous composition $C_n$ comprising at least 50% by weight of a polyaryletherketone.

2. The insulated conductor as claimed in claim 1, wherein said at least one electrical conductor comprises copper or an alloy thereof, aluminum, nickel or silver.

3. The insulated conductor as claimed in claim 1, wherein the melt flow index of the composition $C_n$ has a value ranging from 1 to 100 $cm^3/10$ min, at 380° C. and under a load of 5 kg.

4. The insulated conductor as claimed in claim 1, wherein the composition $C_n$ further comprises another thermoplastic other than a polyaryletherketone and/or a filler and/or an additive.

5. The insulated conductor as claimed in claim 4, wherein the other thermoplastic is chosen from the list consisting of: a fluorinated ethylene-propylene copolymer, a perfluoroalkoxy-alkane copolymer, a perfluoroelastomer, a polyetherimide, a polyetherimide/polydimethylsiloxane block copolymer, a poly(ether sulfone), a polysulfone, a polyphenylene sulfone, a poly(phenylene sulfide), a polyphenylene ether and their mixture.

6. The insulated conductor as claimed in claim 1, wherein the composition $C_n$ consists essentially of said at least one polyaryletherketone.

7. The insulated conductor as claimed in claim 1, wherein said at least one polyaryletherketone consists essentially of:

a terephthalic unit and an isophthalic unit, the terephthalic unit having the formula:

(I)

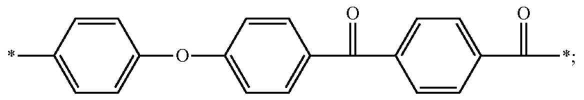

the isophthalic unit having the formula:

(II)

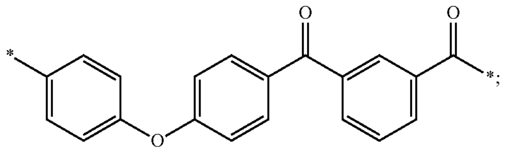

the molar percentage of terephthalic unit relative to the sum of the terephthalic and isophthalic units being from 0% to 85%.

8. The insulated conductor as claimed in claim 1, wherein said at least one polyaryletherketone is a copolymer comprising a unit of formula:

(III)

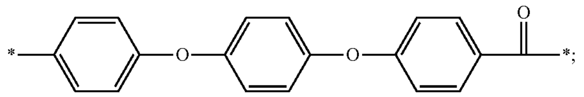

and a unit of formula:

(IV)

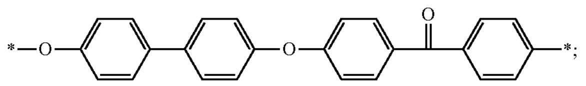

the molar percentage of unit (III), relative to the sum of the units (III) and (IV), being from: 0% to 99%.

9. The insulated conductor as claimed in claim 1, wherein said at least one polyaryletherketone is a copolymer comprising a unit of formula:

(III)

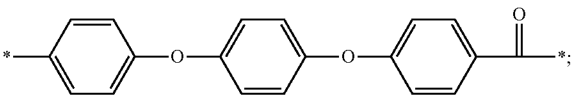

and a unit of formula:

(V)

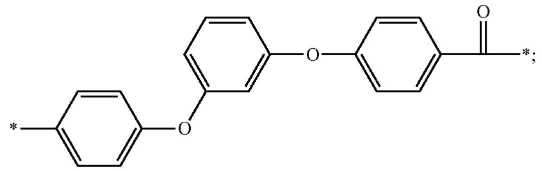

the molar percentage of unit (III), relative to the sum of the units (III) and (V), being from 0% to 99%.

10. The insulated conductor as claimed in claim 1, the $n^{th}$ layer having an average thickness ranging from 5 micrometers to 1000 micrometers.

11. The insulated conductor as claimed in claim 1, wherein the integer n is greater than or equal to 2.

12. The insulated conductor as claimed in claim 11, wherein the insulating coating comprises at least one intermediate layer, between said at least one electrical conductor and the $n^{th}$ layer of the coating, including the $(n-1)^{th}$ layer, which is a semicrystalline composition comprising a thermoplastic polymer having a melting point above or equal to that of the $n^{th}$ layer.

13. The insulated conductor as claimed in claim 12, wherein the at least one intermediate layer, including the $(n-1)^{th}$ layer, consists of a homopolymer consisting of a single repeating unit of formula:

(III)

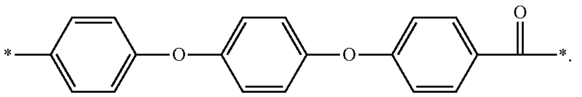

14. The insulated conductor as claimed in claim 11, wherein the insulating coating all comprises at least one intermediate layer, between said at least one electrical conductor and the $n^{th}$ layer of the coating, including the $(n-1)^{th}$ layer, which is a composition comprising a crosslinked thermosetting polymer.

15. A process for manufacturing an insulated conductor as claimed in claim 1, comprising providing said at least one electrical conductor, covered where appropriate with an insulating coating consisting of (n−1) layers, and providing said composition $C_n$, the composition $C_n$ having a melting temperature $T_m$, the process comprising:

a step of heating the composition $C_n$ at a temperature strictly above $T_m$, so as to obtain a melt of composition $C_n$;

applying the composition $C_n$, in the solid or melt state, on said conductor covered where appropriate with (n−1) layers of insulating coating, so as to obtain a conductor covered with composition $C_n$, in the solid or melt state; and, sufficiently rapid cooling of the melt so as to obtain the $n^{th}$ layer of the coating layer in pseudo-amorphous form.

16. A process of heat-welding between two sections of insulated conductor as claimed in claim 1, the two sections having a peripheral layer formed of the same pseudo-amorphous chemical composition C, the composition C having a glass transition temperature $T_g$ and a melting temperature $T_m$, said process comprising:

bringing two sections of insulated conductor into contact;

coalescing the parts of the two sections of insulated conductor brought into contact in order to form an assembly of two coalesced sections, by heating at a temperature above $T_g$; and, crystallizing the composition C of the assembly of the two coalesced sections, by maintaining the heating at a temperature above the temperature $T_g$ of the composition C for a sufficient time.

17. The process as claimed in claim 16, wherein composition C is crystallized to a degree of crystallinity strictly greater than 7%, as measured by WAXS, during the crystallization step.

18. A coil comprising a winding of turns capable of being obtained by:

winding an insulated conductor comprising:

at least one electrical conductor; and, an insulating coating covering said electrical conductor, consisting of n layer(s), "n" being an integer greater than or equal to 1, the $n^{th}$ layer being the outermost layer consisting of a pseudo-amorphous composition $C_n$ comprising at least 50% by weight of a polyaryletherketone, forming a set of turns having areas of contact with one another;

heat-welding of the contact areas by a process as claimed in claim 16.

19. A coil comprising a winding of turns obtained by a process comprising winding an insulated conductor as claimed in claim 1, wherein the insulated conductor forms a set of turns having areas of contact with one another.

* * * * *